United States Patent

Bruckert et al.

[11] Patent Number: 5,903,844
[45] Date of Patent: May 11, 1999

[54] METHOD AND APPARATUS FOR DETERMINING REMOTE UNIT LOCATION IN A COMMUNICATION SYSTEM

[75] Inventors: Eugene J. Bruckert, Arlington Heights; Stephen H. Sanders, III, Chicago, both of Ill.

[73] Assignee: Motorola, Inc., Schaumburg, Ill.

[21] Appl. No.: 08/794,708

[22] Filed: Feb. 4, 1997

[51] Int. Cl.[6] .................................................... H04Q 7/20
[52] U.S. Cl. ......................................... 455/456; 455/458
[58] Field of Search ..................................... 455/456, 440, 455/422, 67.1, 67.6, 524, 31.2, 31.3, 458; 342/457, 463, 450

[56] References Cited

U.S. PATENT DOCUMENTS

| | | | |
|---|---|---|---|
| 3,886,554 | 5/1975 | Braun et al. | 342/457 |
| 3,906,166 | 9/1975 | Cooper et al. | 455/456 |
| 5,095,500 | 3/1992 | Tayloe et al. | 455/456 |
| 5,208,756 | 5/1993 | Song | 455/456 |
| 5,247,698 | 9/1993 | Sawyer et al. | 455/435 |
| 5,404,376 | 4/1995 | Dent | 342/457 |
| 5,428,667 | 6/1995 | Easterling et al. | 455/456 |
| 5,508,708 | 4/1996 | Ghosh et al. | 342/457 |
| 5,513,243 | 4/1996 | Kage | 455/456 |
| 5,583,517 | 12/1996 | Yokev et al. | 342/457 |
| 5,666,662 | 9/1997 | Shibuya | 455/456 |
| 5,675,344 | 10/1997 | Tong et al. | 455/456 |
| 5,734,963 | 3/1998 | Fitzgerald et al. | 455/31.2 |

OTHER PUBLICATIONS

TIA/EIA/IS–95A, 6.1.2.3.2 Closed Loop Output Power, p. 7–1.
TIA/EIA/IS–95–A, 7.7.3.3.2.4 Data Burst Message, pp. 7–2, 7–3.
TIA/EIA/IS–95–A, 7.7.2.3.2.17 General Page Message, pp. 7–14 through 7–22.
TIA/EIA/IS–95–A, 7.7.2.3.2.7 Order Message, pp. 7–12, 7–13.
TIA/EIA/IS–95A, 7.7.2.3.2.6 Page Message, pp. 7–10, 7–11.
TIA/EIA/IS–95–A, 7.7.2.3.2.5 Slotted Page Message, pp. 7–8, 7–9.
TIA/EIA/IS–95–A, 6.1.2.3.1 Estimated Open Loop Output Power, pp. 6–1 through 6–19.

*Primary Examiner*—Dwayne D. Bost
*Assistant Examiner*—Tracy M. Legree
*Attorney, Agent, or Firm*—Kenneth A. Haas

[57] ABSTRACT

The location of a remote unit (113) within a wireless communication system (100) is determined by all base stations (101) within the wireless communication system (100) initiating a first page (wide-area location page) that is broadcast to the remote unit (113) over a paging channel. The serving and neighbor base stations are determined from the remote unit's (113) response to the wide-area location page, and those base stations are instructed to tune receiving elements to obtain data that will be transmitted by the remote unit (113) during location. A second message (Location Page Message) is then broadcast to the remote unit (113) via the serving base station (101). The Location Page Message instructs the remote unit (113) to periodically transmit a known Remote Unit Location Message (RULM) with increasing power levels for a predetermined number of times so that the remote unit's (113) location can be achieved.

18 Claims, 8 Drawing Sheets

| FIELD | LENGTH(BITS) |
|---|---|
| MSG_TYPE | 8 |
| CONFIG_MSG_SEQ | 6 |
| ACC_MSG_SEQ | 6 |
| MORE_PAGES | 1 |
| MSG_SEQ | 3 |
| EXT_ADDR | 1 |
| MIN1 | 24 |
| MIN2 | 0 OR 10 |
| COMMAND | 2 |
| SEQ_IND | 2 |
| SEQ | 0 OR 6 |
| MSG_SETUP_SIZE | 0 OR 6 |
| INC_PWR | 6 |
| MSG_SIZE | 7 |
| MSG_PERIOD | 6 |
| PWR_STEP | 5 |
| MAX_FULL_PWR | 3 |
| MAX_MSGS | 4 |
| ACTION_TIME | 6 |
| ACTION_TIME_FRM | 2 |
| NEW_FREQ | 1 |
| RULM_FREQ | 0 OR 11 |

Rows MSG_TYPE through MIN2 are bracketed as STANDARD FOR IS-95.

*FIG.3*

| FIELD | LENGTH(BITS) |
|---|---|
| MSG_TYPE | 8 |
| ACK_SEQ | 3 |
| MSG_SEQ | 3 |
| ACK_REQ | 1 |
| ENCRYPTION | 2 |
| MSG_NUMBER | 8 |
| BURST_TYPE | 6 |
| NUM_MSGS | 8 |
| NUM_FIELDS | 8 |
| COMMAND | 2 |
| SEQ_IND | 2 |
| SEQ | 0 OR 6 |
| MSG_SETUP_SIZE | 0 OR 6 |
| INC_PWR | 6 |
| MSG_SIZE | 7 |
| MSG_PERIOD | 6 |
| PWR_STEP | 5 |
| MAX_FULL_PWR | 3 |
| MAX_MSGS | 4 |
| ACTION_TIME | 6 |
| ACTION_TIME_FRM | 2 |
| RESERVED | 1, 5, OR 7 |

MSG_TYPE through NUM_MSGS: STANDARD FOR IS-95

*FIG. 7*

METHOD AND APPARATUS FOR DETERMINING REMOTE UNIT LOCATION IN A COMMUNICATION SYSTEM

FIELD OF THE INVENTION

The present invention relates generally to wireless communication systems and, in particular, to a method and apparatus for remote unit location in a wireless communication system.

BACKGROUND OF THE INVENTION

It is well known that a remote unit's location within a wireless communication system may be determined using a trilateration method. According to such a method, distances between the remote unit and multiple base stations are calculated based on a measurement of time delay of a signal traveling between the remote unit and each base station. Such a prior-art method for calculating a remote unit's location is described in U.S. Pat. No. 5,508,708 "Method and Apparatus for Location Finding in a CDMA System" by Ghosh et al. and incorporated by reference herein. As described in U.S. Pat. No. 5,508,708, when location of a remote unit is desired, the uplink signal transmitted from the remote unit to multiple base stations is analyzed to determine propagation delay differences at each base station. From these propagation delay differences, a distance is calculated from each base station to the remote unit, and the location of the remote unit is determined.

Although prior-art methods of location can accurately determine the location of a remote unit, these methods are limited in that they are only capable of determining the location of remote units that are actively transmitting an uplink signal. In a commercial setting, where many remote units may be idle (i.e., monitoring a paging channel, but not actively transmitting an uplink signal), prior-art methods of location may be unavailable for a large population of remote units utilizing the communication system. Thus a need exists for a method and apparatus for remote unit location in a communication system that is capable of estimating the location of a remote unit not actively transmitting an uplink signal.

BRIEF DESCRIPTION OF THE DRAWINGS

FIG. 3 illustrates of a Location Page Message in accordance with the preferred embodiment of the present invention.

FIG. 7 illustrates a Location Request Message in accordance with the alternate embodiment of the present invention.

DETAILED DESCRIPTION OF THE DRAWINGS

Stated generally, the location of a remote unit within a wireless communication system is determined by all base stations within the communication system initiating a first page (wide-area location page) that is broadcast to the remote unit over a paging channel. The serving and neighbor base stations are determined from the remote unit's response to the wide-area location page and those base stations are instructed to tune receiving elements to obtain data that will be transmitted by the remote unit during location. A second message (Location Page Message) is then broadcast to the remote unit via the serving base station. The Location Page Message instructs the remote unit to periodically transmit a known Remote Unit Location Message (RULM) with increasing power levels a predetermined number of times so that remote unit's location can be achieved.

The present invention encompasses a method for locating a remote unit in a communication system. The method comprises sending a first message to the remote unit instructing the remote unit to send a second message to a serving base station. The base station receives the second message transmitted from the remote unit in response to the first message and determines the serving and a neighbor base station from the second message. Next, a third message is transmitted to the remote unit instructing the remote unit to send a fourth message to the serving base station and the neighbor base station. After reception of the fourth message a location of the remote unit is determined by analyzing the fourth message.

An alternate embodiment of the present invention encompasses a method for locating a remote unit in a communication system. The method comprises instructing a plurality of base stations within the communication system to transmit a first message. The first message instructs the remote unit to transmit a second message at a specified time. The first message also contains a field that indicates the second message to be transmitted and a time period to begin transmission of the second message. After reception of the second message a location is determined by analyzing the second message.

Yet another embodiment encompasses a communication system capable of transmitting a message to a remote unit. The communication system comprises a transmitter for transmitting the message. In the preferred embodiment of the present invention the message includes a field that indicates a second message that is to be transmitted by the remote unit. Additionally, the message includes a field that indicates when the second message is to be transmitted and a field that indicates an initial power at which the remote unit is to transmit the second message. The communication system additionally includes a location searcher for receiving the second message and determining the location of the remote unit.

Figure 1:
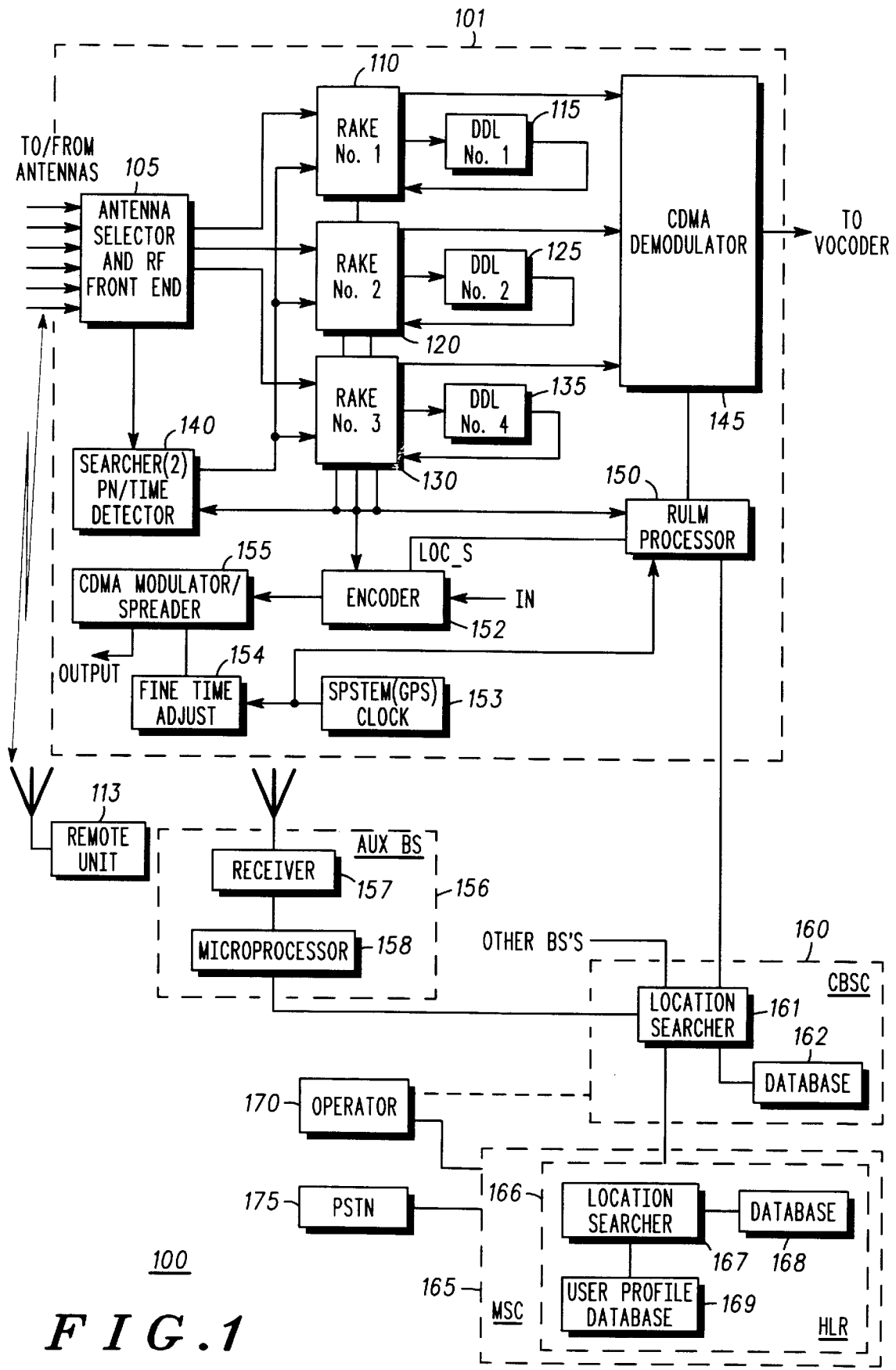
FIG. 1 is a block diagram of a communication system in accordance with the preferred embodiment of the present invention.

FIG. 1 is a block diagram of a communication system in accordance with the preferred embodiment of the present invention. Wireless communication system 100 is preferably a cellular communication system that utilizes a Code Division Multiple Access (CDMA) system protocol, however, in alternate embodiments of the present invention communication system 100 may utilize any analog or digital system protocol such as, but not limited to, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 comprises remote unit 113, wireless infrastructure equipment, including auxiliary base station 156, Centralized Base Station Controller (CBSC) 160, Mobile Switching Center (MSC) 165, Home Location Register (HLR) 166, and base station 101. As shown, base station 101 has common RF front end 105 which feeds independent rake inputs 110, 120, and 130. A communication system utilizing the CDMA system protocol is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (IS-95A) which is incorporated by reference herein.

Operation of Communication system 100 in accordance with the preferred embodiment of the present invention occurs as follows: To initiate a location request, a command is originated at a regional entity such as MSC 165, operations center 170, or perhaps within a connected network such as Public Switched Telephone Network (PSTN) 175. The location request, which includes identification information on the remote unit that is to be located, enters MSC 165. In the preferred embodiment of the present invention the location request is passed to location searcher 167 existing in HLR 166. HLR 166 instructs all base stations within the cellular system to send a first message to remote unit 113. In particular, all base stations within the cellular system initiate a first page (hereinafter referred to as a wide-area location page) that is broadcast to remote unit 113 over a paging channel. In the preferred embodiment of the present invention the wide-area location page is one of the Slotted Page Message (IS-95A, section 7.7.2.3.2.5), Page Message (IS-95A, section 7.7.2.3.2.6), and the General Page Message (IS-95A, section 7.7.2.3.2.17), however other pages may be utilized as well. In the preferred embodiment of the present invention the wide-area location page is utilized to determine a gross location of remote unit 113. Remote unit 113 responds to the wide-area location page by transmitting a message to the serving base station. In the preferred embodiment of the present invention, remote unit 113 sends an acknowledgment order (Ack) to the serving base station in response to the wide-area location page, which is passed though CBSC 160 to HLR 166. In particular, the Ack is the Page Response Message as described in IS-95A, section 6.7.1.3.2.5, however in an alternate embodiment of the present invention, the wide-area location page is the Location Page Message with remote unit 113 responding by sending a RULM.

Continuing, HLR 166 then determines (from remote unit's 113 Ack) the base station serving remote unit 113 (i.e., serving base station that provides remote unit 113 with a reference pilot). Upon determination of the serving base station, HLR 166 determines (by accessing an internal database 168) those base stations neighboring the serving base station, and instructs CBSC 160 to tune receiving elements in the neighboring base stations to obtain data that will shortly be transmitted by remote unit 113 during location. In the preferred embodiment of the present invention, remote unit 113 is instructed when to broadcast data and all neighbor base stations are instructed as to when remote unit 113 will be transmitting. (As will be discussed below, timing information is provided to the neighbor base stations to reduce the search window when looking for the remote unit's transmissions. This window can be further reduced by taking into account certain parameters obtained in demodulating remote unit's Ack to the wide-area location page, (e.g., the delay and angle of arrival of the Ack.))

Continuing, once the serving and neighboring base stations are instructed to "listen" for remote unit 113, HLR 166 instructs CBSC 160 to transmit a second message (Location Page Message) via the serving base station to remote unit 113 over a paging channel. The Location Page Message instructs remote unit 113 to periodically transmit a known Remote Unit Location Message (RULM) with increasing power levels a predetermined number of times. Additionally, the Location Page Message provides remote unit 113 with a predetermined time to begin transmitting the RULM. (Further details on the Location Page Message are discussed below with reference to FIG. 3). In the preferred embodiment of the present invention, remote unit 113 transmits the RULM on a traffic channel using the remote unit's own public long code so that remote unit's 113 increased power transmission does not affect normal access channel messages from other remote units 113, but in alternate embodiments of the present invention, remote unit 113 may transmit the RULM via other channels (an access channel for example). Additionally, in an alternate embodiment of the present invention, remote unit 113 may transmit the RULM utilizing a specific frequency that is reserved for RULM transmission. In particular, to reduce system interference, remote unit 113 may be instructed to transmit the RULM on a frequency different than one utilized for normal traffic channel transmissions.

Continuing, RULM processor 150 of base station 101 (and similar processors of neighboring base stations) utilize detector 140 to determine propagation delay in the RULM between remote unit 113 and the base station by measuring the RULM arrival time via system clock 353. This may be accomplished as described in U.S. Pat. No. 5,508,708 by all bases determining the leading edge rise time of a specified group of Pseudo Noise (PN) chips, for example by determining the rise time for each 64th chip (i.e.., PN sequence number 0, 64, 128, etc.) for a predetermined number of chips, or may be accomplished via other location methods (e.g., U.S. Pat. No. 5,583,517 "Multi-Path Resistant Frequency-Hopped Spread Spectrum Mobile Location System" or U.S. Pat. No. 3,886,554 "Method and Apparatus for Improving the Accuracy of a Vehicle Location System"). Once enough data has been collected, HLR 166 instructs the serving base station to send an acknowledgment (Ack) to remote unit 113, instructing it to cease transmission. The propagation delay at each base station is then forwarded by each base station 101, along with its base station identification, to a designated entity, e.g. location searcher 161 of BSC 160, or location searcher 167 of HLR 166, etc., and distances between remote unit 113 and the multiple base stations are calculated (based on the measurement of the propagation delay measurements) to determine the location of remote unit 113.

Figure 2:
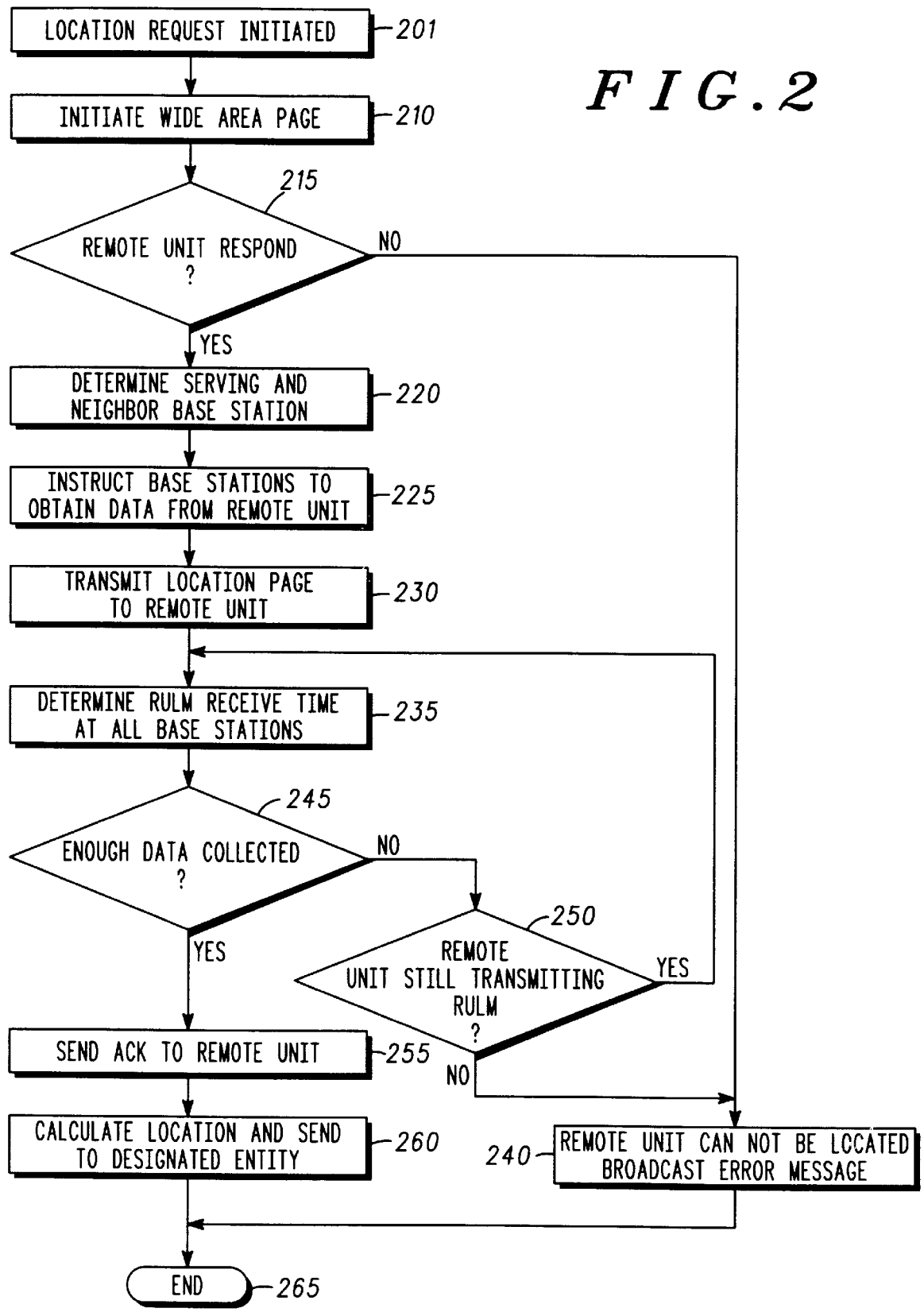
FIG. 2 is a flow chart illustrating a method of operating the communication system of FIG. 1 in accordance with the preferred embodiment of the present invention.

FIG. 2 is a flow chart illustrating a method of operating communication system 100 of FIG. 1 in accordance with the preferred embodiment of the present invention. The logic flow begins at step 201 where a location request is initiated. Next, at step 210 location searcher 167 instructs all base stations within communication system 100 to transmit a wide-area location page. As mentioned above, the wide-area location page is utilized to determine a gross location of remote unit 113 from remote unit's 113 response to the page.

Continuing, at step 215 location searcher 167 determines if remote unit 113 has responded to the wide-area location page, and if not the logic flow continues to step 240 where an error message is transmitted to the regional entity that requested the location, and the logic flow ends at step 265. If at step 215 it is determined that remote unit 113 has responded to the wide-area location page, location searcher 167 determines serving and neighbor base stations (step 220) and instructs the serving and neighbor base stations to obtain data (RULM) from remote unit 113 (step 225). In the preferred embodiment of the present invention the neighbor base stations stored in internal database 168 are determined by geographic and propagation proximity to the serving base station, however, in an alternate embodiment of the present invention the neighbor base stations can be determined by other parameters (e.g., delay and/or sector received of the remote unit's 113 Ack to the wide-area location page). At step 230 a Location Page Message is transmitted to remote unit 113. As discussed above, the Location Page Message instructs remote unit 113 to transmit a known RULM at a specified time. (i.e. the Location Page Message identifies the RULM that remote unit 113 is to transmit along with the time the RULM is to be transmitted). In addition the Location Page Message also instructs remote unit 113 to continue transmission of the RULM for a predetermined number of times with increasing power levels. RULM processor 150 of base station 101 (and similar processors of other neighboring base stations) utilize detector 140 and system clock 153 to determine the chip receive times of the RULM (step 235). At step 245 it is determined if enough data has been collected to make an accurate estimation of remote unit 113 location, and if not the logic flow continues to step 250 where location searcher 166 determines if remote unit 113 is still transmitting an RULM. If it is determined at step 250 that remote unit 113 is still transmitting an RULM the logic flow returns to step 235 where RULM receive time is again determined. However, if at step 250 it is determined that remote unit 113 has ceased transmitting an RULM, the logic flow continues to step 240 where an error message is transmitted to the regional entity requesting the location, and the logic flow ends at step 265.

Once it has been determined that enough data has been collected for accurate location (step 245) the logic flow continues to step 255 where location searcher 167 instructs the serving base station to send an Ack to remote unit 113 instructing remote unit 113 to cease transmission of the RULM. The logic flow continues to step 260 where a designated entity, e.g. location searcher 161 of CBSC 160, or location searcher 167 of HLR 166 determines a location for remote unit 113. The location is passed on to the designated entity requesting location (step 260) and the logic flow ends at step 265.

FIG. 3 illustrates a Location Page Message in accordance with the preferred embodiment of the present invention. In the preferred embodiment, the Location Page Message is a variable bit message broadcast to remote unit 113 over a standard paging channel and contains fields that are described in Table 1 below:

TABLE 1

| | Location Page Message |
|---|---|
| MSG_TYPE to MIN2 | These fields are standard for paging channel messages and are described in IS-95A, Section 7.7.2.3.2.7. |
| COMMAND | If this field is set to "00", the remote unit will send the RULM based on parameters in subsequent fields. If this field is set to "01", the remote unit will stop sending the RULM and there are no subsequent fields. |
| SEQ_IND | If this field is set to "01", the next field will be |

TABLE 1-continued

| | Location Page Message |
|---|---|
| | the 8 bit sequence that remote unit 113 is to transmit back as an RULM. If this field is set to "00", remote unit 113 will transmit standard traffic channel preamble frames as an RULM. |
| SEQ | This field stores the 8 bit sequence the remote unit is to repetitively transmit as an RULM. This field is present only if the SEQ_IND field is "1." |
| MSG_SETUP_SIZE | This field is the number of power control groups the RULM is delayed prior to sending it at incremental power. |
| INC_PWR | This field represents the incremental power at which remote unit 1.13 is to transmit the RULM. In the preferred embodiment of the present invention INC_PWR is initially set to 10 dB above the remote unit's nominal transmit power described in IS-95A, section 6.1.2.3.1. |
| MSG_SIZE | This field indicates the number of power control groups remote unit 113 will transmit the 8 bit sequence or traffic channel preamble at the end of the last MSG_SETUP_SIZE power control group. In other words, the RULM will consist of either a repeated 8 bit sequence or a traffic channel preamble transmitted for MSG_SIZE power control groups and starting MSG_SETUP_SIZE power control groups after a frame boundary. |
| MSG_PERIOD | This field indicates the time remote unit 113 must wait between consecutive transmission starts of the RULM. |
| PWR_STEP | PWR_STEP is the amount (in dB) to increase the power output (INC_PWR) of the MSG SIZE power control groups over those of the previous RULM. In the preferred embodiment of the present invention PWR_STEP = 5 dB. |
| MAX_FULL_PWR | This field represents the maximum number of RULMs that remote unit 113 will transmit at full power before sending a special message and terminating transmission. |
| MAX_MSGS | This field represents the maximum number of RULMs to transmit at incremented power. Each incremented power transmission message will increase by PWR_STEP over the previous incremented power output. |
| ACTION_TIME | This field represents the time for the beginning of the first increased power transmission. It shall be set to the System Time, in units of 80 ms (modulo 64). |
| ACTION_TIME_FRM | This field represents the frame number after the system time specified in ACTION_TIME to begin the RULM.. |
| REPEAT_TIME | This field represents the time between location responses. This parameter allows the base station to request remote unit 113 to autonomously perform the reverse traffic channel procedure on a repeated bases. If this value is set to zero, the procedure is performed by the remote unit only once. |
| NEW_FREQ | This field indicates whether the RULM is to be sent on the present frequency or sent on another frequency. If this field is "0" the remote unit remains on the present transmit frequency. If this field is "1" the remote unit switches to a new frequency to transmit the RULM. |
| RULM_FREQ | This field represents the CDMA Channel number corresponding to the frequency that the remote unit tunes to for sending the RULM. This field is zero length if NEW_FREQ is "0." |

As discussed in Table 1, INC_PWR is set to 10 dB above the remote unit's nominal transmit power described in IS-95A, section 6.1.2.3.1, however in alternate embodiments of the present invention INC_PWR is determined by HLR 166 from the Page Response Message. In particular, in an alternate embodiment INC_PWR is a value inversely proportional to the delay of the remote unit's 113 Ack to the wide-area location page. Additionally, in a further alternate embodiment INC_PWR is determined from system conditions. In particular, if the amount of traffic carried by base station 101 is above a threshold value or if remote unit 113 can communicate with multiple base stations 101 (e.g., remote unit 113 indicates in the Ack to the wide-area location page what base stations 101 have sufficient signal for communication), INC_PWR is reduced to 5 dB. Yet a further alternative for determining INC_PWR is for remote unit 113 to transmit at full power as quickly as possible by setting both the INC_PWR and PWR_STEP to maximum values allowed.

Figure 4:
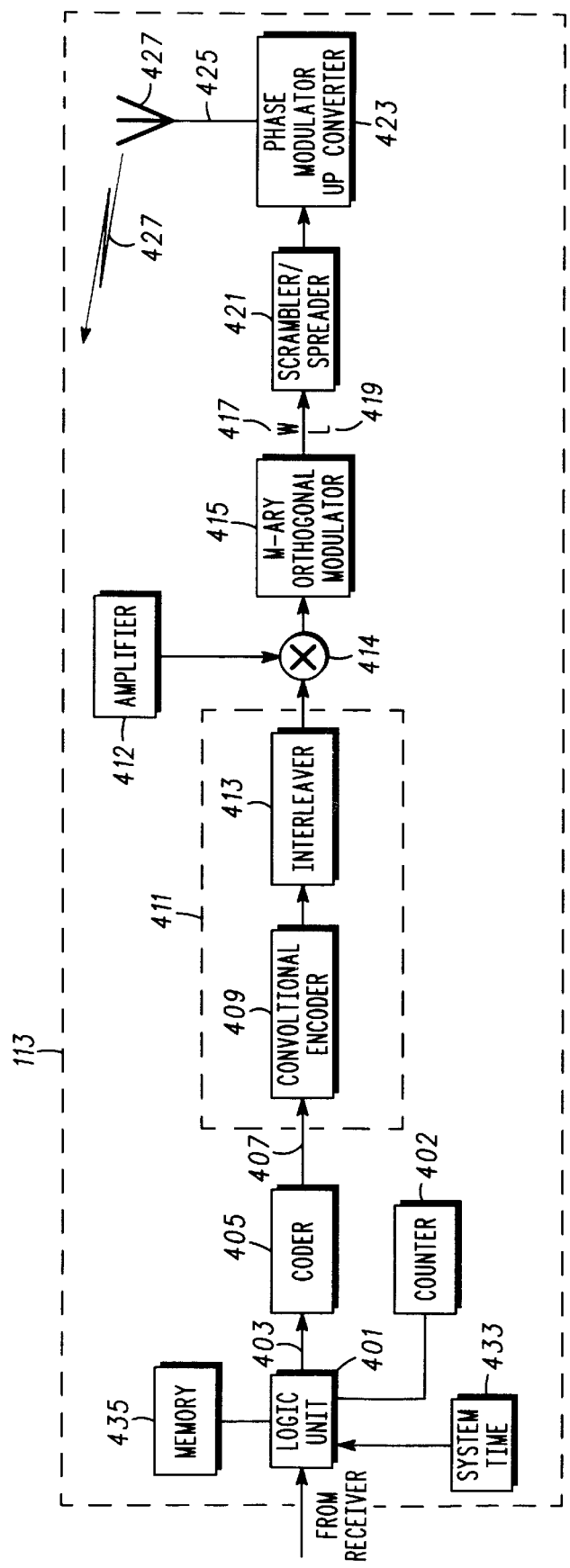
FIG. 4 is a block diagram of the remote unit of FIG. 1 in accordance with the preferred embodiment of the present invention.

FIG. 4 is a block diagram illustrating remote unit 113 of FIG. 1 in accordance with the preferred embodiment of the present invention. Remote unit 113 comprises logic unit 401, coder 405, convolutional encoder 409, interleaver 413, orthogonal modulator 415, scrambler/spreader 421, multiplier 414, amplifier 412, system clock 433, memory 435 and upconverter 423. Remote unit 113 transmits signal 427 utilizing the CDMA system protocol as described in IS-95A. Operation of remote unit 113 occurs as follows: Logic unit 401 determines an RULM to be transmitted and the time, channel, frequency, and power level for its transmission. As discussed above, the RULM to be broadcast is determined from the Location Page Message that was received by the remote unit and stored in memory 435. Once logic unit 401 determines the RULM to be transmitted, logic unit 401 tunes remote unit 113 to the proper frequency (RULM_FREQ if NEW_FREQ is 1), and outputs the RULM at a time determined by both clock 433 and the Location Page Message ACTION_TIME. In the preferred embodiment of the present invention RULM is output as data bit stream 403. Data bit stream 403 enters a variable-rate coder 405, which produces a signal 407 comprised of a series of transmit channel frames having varying transmit data rates. As discussed in IS-95A, transmit data rate of each frame depends on the characteristics of data bit stream 403. Encoder block 411 includes a convolutional encoder 409 and an interleaver 413. At convolutional encoder 409, each frame may be encoded by a rate ⅓ encoder using well-known algorithms such as convolutional encoding algorithms which facilitate subsequent decoding of frames. Interleaver 413 operates to shuffle the contents of frames using commonly-known techniques such as block interleaving techniques. Interleaved bits are then amplified via amplifier 412 and multiplier 414. Each frame of digitally coded and interleaved bits includes ninety-six groups of six coded bits, for a total of 576 bits. Each group of six coded bits represents an index to one of sixty-four symbols such as Walsh codes. A Walsh code corresponds to a single row or column of a sixty-four-by-sixty-four Hadamard matrix, a square matrix of bits with a dimension that is a power of two. Typically, the bits comprising a Walsh code are referred to as Walsh chips. Each of the ninety-six Walsh code indices in the frame are input to an M-ary orthogonal modulator 415, which is preferably a sixty-four-ary orthogonal modulator. For each input Walsh code index, M-ary orthogonal modulator 415 generates at output 419 a corresponding sixty-four-bit Walsh code W 417. Thus, a series of ninety-six Walsh codes W 417 is generated for each frame input to M-ary orthogonal modulator 415.

Scrambler/spreader block 421, among other things, applies a first pseudorandom noise sequence (long code) and a second pseudorandom noise sequence to the series of Walsh codes W 417 using well-known scrambling techniques. In the preferred embodiment of the present invention the long code is the public long code assigned to remote unit 113, however in an alternate embodiment the long code is the access channel long code. At block 423, the scrambled series of Walsh codes W 417 (representing the RULM) is phase modulated using an offset binary phase-shift keying (BPSK) modulation process or another modulation process, up-converted and transmitted as communication signal 427 from antenna 425.

During normal operation, clock 433 derives system time by synchronizing to transmissions from the strongest base station 101. If remote unit 113 receives a Location Page Message, system time is not changed during the location interval. In the preferred embodiment of the present invention, if the remote unit is unable to maintain synchronization with the original base station 101 an Ack is sent from remote unit 113 terminating the location signaling. In an alternative embodiment of the present invention, the remote unit derives system time from the strongest base station but does not slew its clock to the new estimate of system time during transmission of the RULM.

Figure 5:
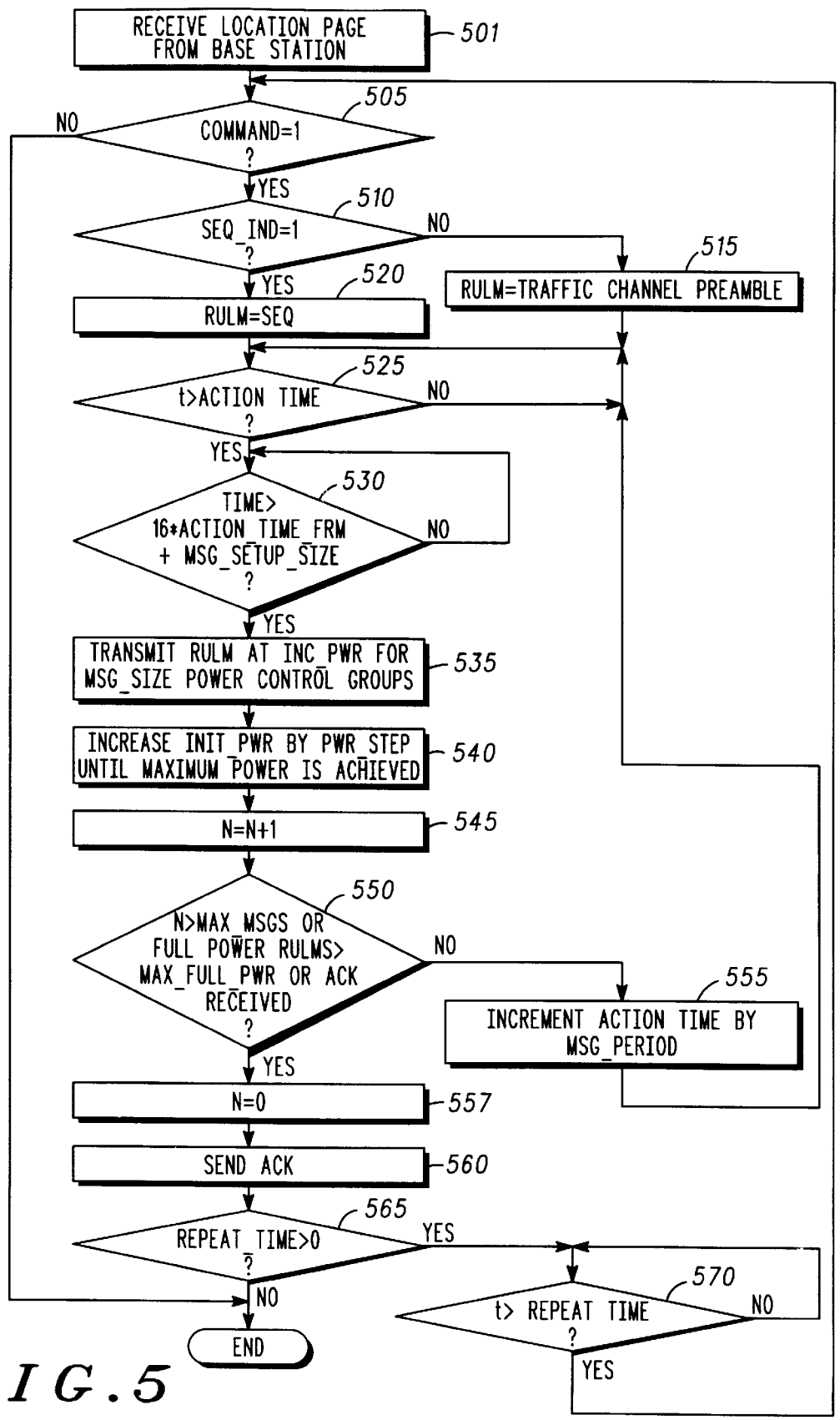
FIG. 5 is a flow chart illustrating a method of operating the logic unit of FIG. 4 in accordance with the preferred embodiment of the present invention.

FIG. 5 is a flow chart illustrating a method of operating logic unit 401 of FIG. 4 in accordance with the preferred embodiment of the present invention. The logic flow begins at step 501 where remote unit 113 receives a Location Page Message from a base station. Next, at step 505 logic unit 401 determines if the COMMAND field of the Location Page Message is "01", and if not the logic flow ends at step 575, otherwise the logic flow continues to step 510 where it is determined if SEQ_IND is set to a "1" or "0." If at step 510 SEQ_IND is set to "0" then remote unit 113 is to set RULM equal to the traffic channel preamble (step 515), otherwise RULM is set equal to SEQ (step 520).

The logic flow continues to step 525 where logic unit 401 accesses system time from clock 433 and determines a time to broadcast the RULM. If at step 525 the system time is greater than ACTION_TIME the logic flow continues to step 530, otherwise the logic flow returns to step 525. At step 530 logic unit 401 determines if the current time is greater than the frame in which the RULM starts (ACTION_TIME_FRM) plus its portion in which the RULM is prevented from being sent MSG_SETUP_SIZE). In other words, logic unit determines if the current time>16* (ACTION_TIME_FRM)+MSG_SETUP_SIZE, and if not, the logic flow returns to step 530, otherwise the logic flow continues to step 535 where the RULM is broadcast at an incremental transmit power level equal to INC_PWR for a number of power control groups equal to MSG_SIZE. In particular, logic unit 401 instructs amplifier 412 to amplify the RULM a predetermined amount and the RULM is continuously broadcast by remote unit 113 for MSG_SIZE power control groups. In the preferred embodiment of the present invention all serving and neighboring base stations within communication system 100 are provided with the Location Page Message in order to determine the exact contents of the RULM along with the time and frame that remote unit transmits the RULM. This is done so that all serving and neighbor base stations within communication system 100 will know when to tune receiving elements for reception of the RULM transmitted by remote unit 113.

Continuing, at step 540 logic unit 401 instructs amplifier 412 to increase the incremented transmit power level by PWR_STEP and counter 402 is indexed (step 545). In the preferred embodiment of the present invention logic unit 412 reads the nominal power level from memory 435, adds to it the newly calculated INC_PWR and instructs amplifier 412 to send at this power. In an alternate embodiment logic unit 113 compares the nominal power during the previous RULM to the present stores in memory 435 the larger of the two and adds it to the newly calculated INC_PWR. In another alternate embodiment logic unit 401 instructs amplifier 412 to set the transmit power level to an absolute value determined from INC_PWR and ignore the nominal power during the MSG_SIZE interval. The logic flow continues to step 550.

At step 550 logic unit 401 determines three conditions; 1) if the maximum number of RULM transmissions has been exceeded, 2) if remote unit 113 has transmitted the RULM at full power for greater than a predetermined number of times, and 3) if the base station has received enough data for location determination. In the preferred embodiment of the present invention, these conditions are determined by 1) determining if the counter (n) has exceeded MAX_MSGS, 2) determining if remote unit 113 has transmitted RULMs at full power for greater than MAX_FULL_PWR messages, and 3) determining if an Ack has been received from a base station indicating that remote unit should cease RULM transmission. If at step 550, all of these conditions are false, the logic flow proceeds to step 555 where ACTION_TIME is incremented by MSG_PERIOD and then to step 525 to await the time for the next transmission, otherwise the logic flow continues to step 557.

Once it has been determined to cease RULM transmission, counter 402 is reset by setting N to "0" (step 557), and an Ack is transmitted indicating that the RULM has ceased to be broadcast (step 560). Next, at step 565 logic unit 401 determines if remote unit 113 should perform RULM transmissions on a periodical basis. This is accomplished by determining if REPEAT_TIME>0. If, at step 565 it is determined that REPEAT_TIME>0, then the logic flow continues to step 570 where remote unit 113 waits for a period of REPEAT_TIME before returning to step 505. If, at step 565 it is determined that REPEAT_TIME is not greater than "0", then the logic flow ends at step 575.

Table 2 illustrates the data bit stream 403 of an RULM that is two frames in duration when the SEQ field of the page message is other than all 0's. The time sequencing of the data stream illustrated in Table 2 is firstly from left to right, secondly from top to bottom. In the preferred embodiment of the present invention, the BURST_TYPE bits are determined by the operator 170 and the SEQ bits are that of the SEQ field of table 1.

TABLE 2

Data bit stream of a two frame RULM

| Field | Length | Value |
|---|---|---|
| CTL | 4 | 1011 |
| MSG_TYPE | 8 | 00000100 |
| ACK_SEQ | 3 | 000 |
| MSG_SEQ | 3 | 000 |
| ACK_REQ | 1 | 1 |
| ENCRYPTION | 2 | 00 |
| MSG_NUMBER | 8 | 00000000 |
| BURST_TYPE | 6 | TBD |
| NUM_MSGS | 8 | 00000001 |
| NUM_FIELDS | 8 | 00100100 |
| SEQ | 8 | repeated 15 times |
| RESERVED | 1 | 0 |
| CTL | 4 | 1011 |
| SEQ | 8 | repeated 21 times |

Figure 6:
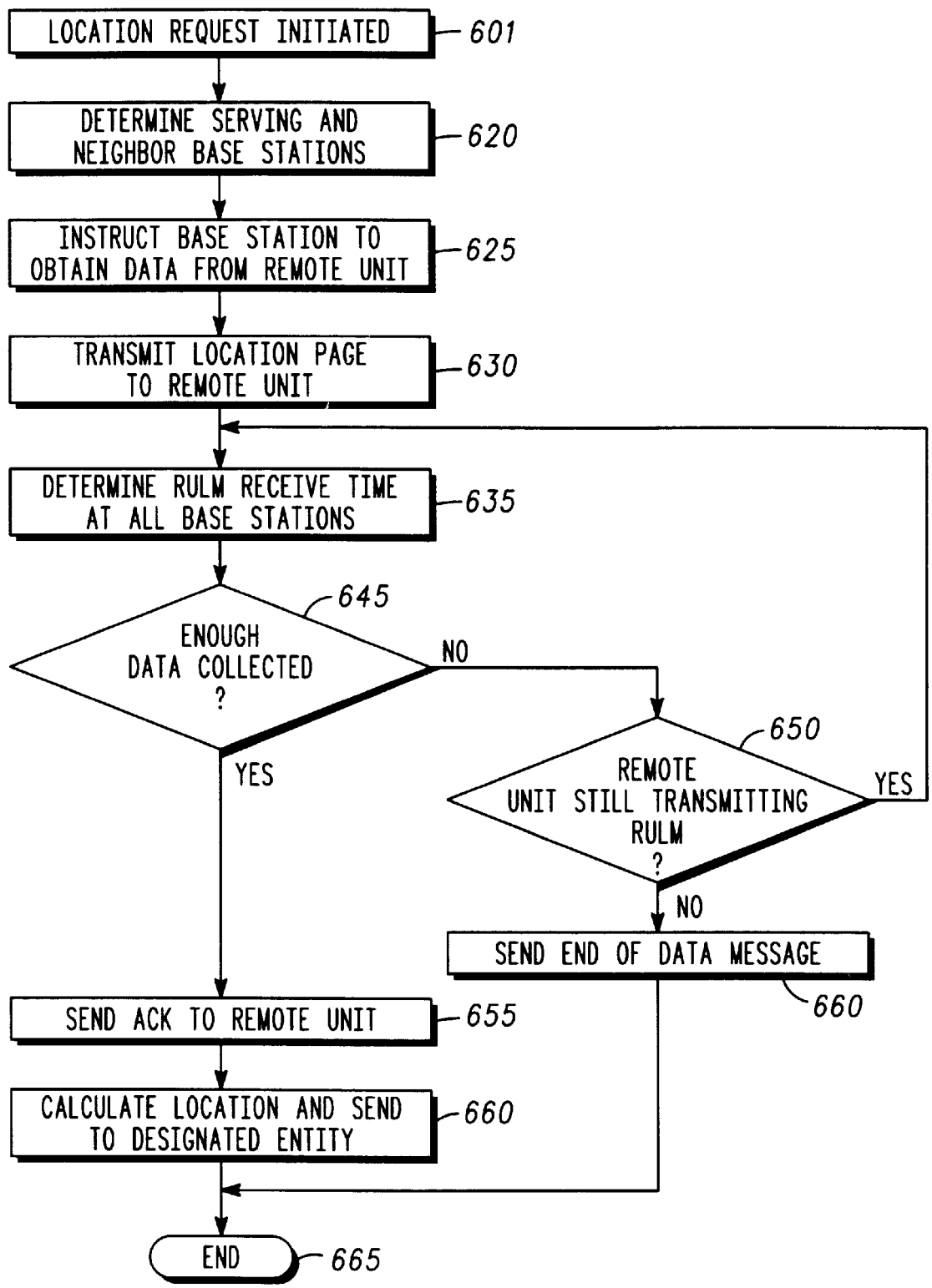
FIG. 6 is a flow chart illustrating a method of operating the communication system of FIG. 1 in accordance with an alternate embodiment of the present invention.

FIG. 6 is a flow chart illustrating a method of operating the communication system of FIG. 1 in accordance with an alternate embodiment of the present invention. In the alternate embodiment the remote unit is actively transmitting on a traffic channel when location is desired. The logic flow begins at step 601 where a Location Request Message is initiated for a remote unit already in communication with base stations 101 on a traffic channel (the active base stations). Next, location searcher 167 determines active and neighbor base stations (step 620) and instructs the active and neighbor base stations to obtain data (RULM) from remote unit 113 (step 625). In the alternate embodiment of the present invention the neighbor base stations stored in internal database 168 are determined by geographic and propagation proximity to active base stations 101 in communication with remote unit 113. However, in yet another alternate embodiment, the neighbor base stations are additionally determined by other parameters, e.g., delay of the remote unit's frames on the traffic channel.

At step 630 a Location Request Message is transmitted to remote unit 113 by active base stations 101. The Location Request Message instructs remote unit 113 to transmit a known RULM at a specified time, with increasing power levels. In addition, the Location Request Message also instructs remote unit 113 to continue transmission of the RULM for a predetermined period of time. RULM processor 150 of base stations 101 (and similar processors of other neighboring base stations) utilize detector 140 and system clock 153 to determine the chip receive times of the RULM (step 635) and at step 645 it is determined if enough data has been collected to make an accurate estimation of remote unit 113 location, and if not the logic flow continues to step 650 where location searcher 166 determines if remote unit 113 is still transmitting a RULM. If it is determined at step 650 that remote unit 113 is still transmitting a RULM the logic flow returns to step 635 where chip receive times are again determined. However, if at step 650 it is determined that remote unit 113 has ceased transmitting a RULM, the logic flow sends an end-of-data message at step 660.

Once it has been determined that enough data has been collected for accurate location (step 645) the logic flow continues to step 655 where location searcher 167 instructs the active base stations 101 to send an Ack to remote unit 113 instructing remote unit 113 to cease transmission of the RULM. The logic flow continues to step 660 where a designated entity, e.g. location searcher 161 of CBSC 160, or location searcher 167 of HLR 166 determines a location for remote unit 113. The location is passed on to the designated entity requesting location (step 660) and the logic flow ends at step 665.

FIG. 7 illustrates a Location Request Message in accordance with the alternate embodiment of the present invention. In the alternate embodiment, base stations 101 interrupt the transmission of normal traffic channel frames to remote unit 113 over the assigned traffic channels by replacing one frame with the Location Request Message. The Location Request Message contains fields that are described in Table 3 below:

TABLE 3

Location Request Message

| | |
|---|---|
| MSG_TYPE through NUM_FIELDS | This field is standard for Data Burst Message, and is described in IS-95A, Section 7.7.3.3.2.4. |
| COMMAND | This field is set to "00", the remote unit will send the RULM based on parameters in subsequent fields. If this field is set to "01", |

TABLE 3-continued

Location Request Message

| | |
|---|---|
| | the remote unit will stop sending the RULM and there are no subsequent fields. |
| SEQ_IND | If this field is set to "00", the next field will be zero length and the remote unit 113 will transmit back normal traffic channel bits. If this field is set to "01", the next field will be zero length and remote unit 113 will transmit standard traffic channel preamble frames as an RULM. If this field is set to "10", the next field will be the 8 bit sequence that remote unit 113 is to transmit back as an RULM |
| SEQ | This field stores the 8 bit sequence the remote unit is to repetitively transmit as an RULM. This field is present only if the SEQ IND field is "10." |
| MSG_SETUP_SIZE | This field is the number of power control groups the RULM bits are transmitted at nominal power prior to sending them at incremental power. |
| INC_PWR | This field represents the incremental power at which remote unit 113 is to transmit the RULM. In the alternate embodiment of the present invention INC_PWR is set to 10 dB above the remote unit's nominal transmit power described in IS-95A, section 6.1.2.3.2 |
| MSG_SIZE | This field indicates the number of power control groups remote unit 113 will transmit the RULM at incremental power. In other words, the RULM will consist of MSG_SETUP_SIZE power control groups transmitted at nominal power immediately followed by MSG_SIZE power control groups transmitted at INC_PWR power and the remainder of the power control groups in the frame transmitted at minimal power. |
| MSG_PERIOD | This field indicates the time remote unit 113 must wait between consecutive transmission starts of the RULM |
| PWR_STEP | PWR_STEP is the amount (in dB) to increase the power output (INC_PWR) of the MSG SIZE power control groups over those of the previous RULM. In the alternate embodiment of the present invention PWR_STEP = 5 dB |
| MAX_FULL_PWR | This field represents the maximum number of RULMs that remote unit 113 will transmit at full power before sending a special message and terminating transmission. |
| MAX_MSGS | This field represents the maximum number of RULMs to transmit at incremented power. Each incremented power transmission message will increase the power by PWR_STEP over the last power output |
| ACTION_TIME | This field represents the time for the beginning of the first increased power transmission. It shall be set to the System Time, in units of 80 ms (modulo 64) |
| ACTION_TIME_FRM | This field represents the frame number after the system time specified in ACTION_TIME to begin the first increased power control transmission. |

In the preferred embodiment of the present invention if the values MSG_SETUP_SIZE and MSG_SIZE do not add up to an integer number of frames, the last frame is filled with SEQ bits and transmitted at nominal power.

Figure 8:
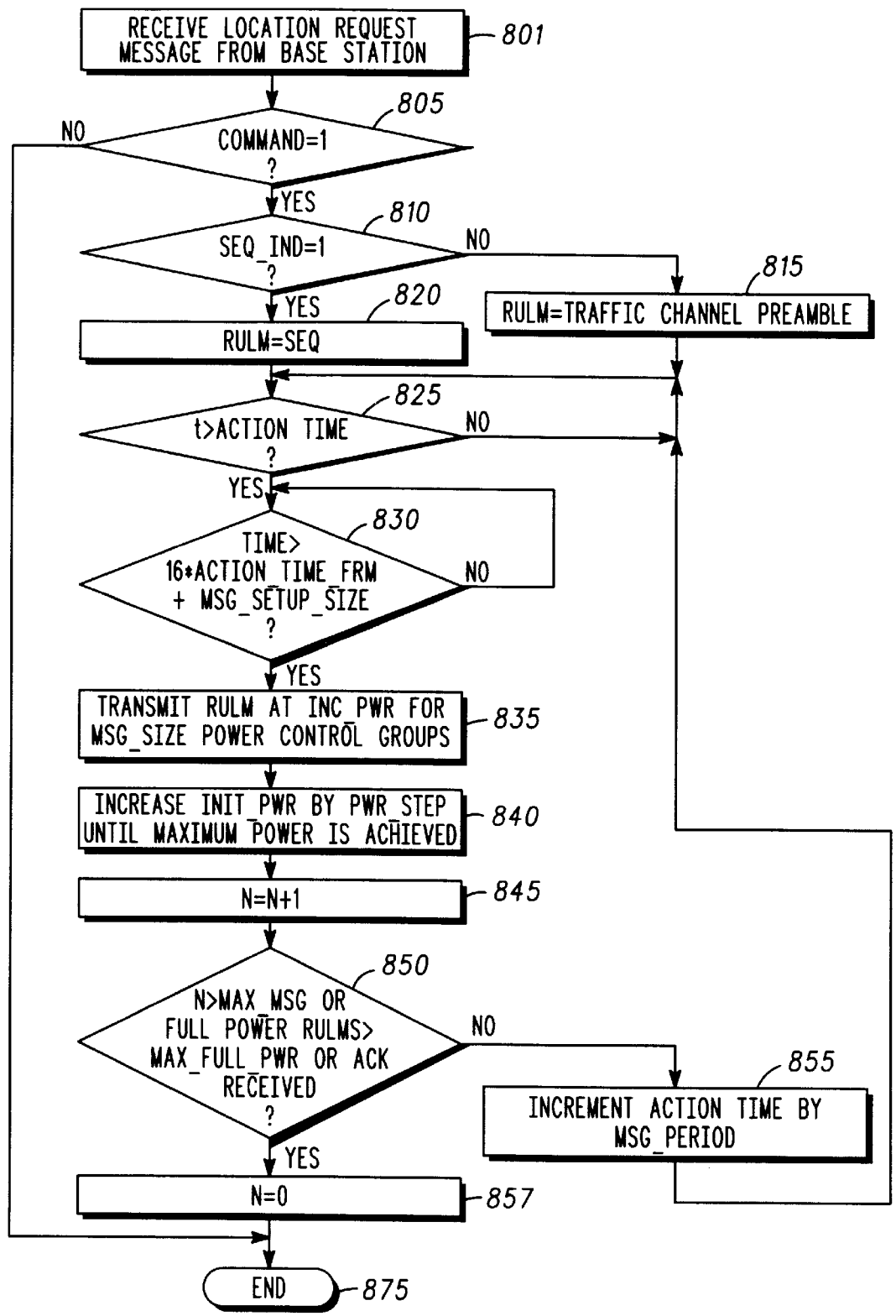
FIG. 8 is a flow chart illustrating a method of operating the logic unit of FIG. 4 in accordance with the alternate embodiment of the present invention.

FIG. 8 is a flow chart illustrating a method of operating logic unit 401 of FIG. 4 in accordance with the alternate embodiment of the present invention. As described above, the alternate embodiment of the present invention locates remote unit 113 when remote unit 113 is actively communicating on a traffic channel. The logic flow begins at step 801 where remote unit 113 receives a Location Request Message from a base station. Next, at step 805 logic unit 401 determines if the COMMAND field of the Location Request Message is "01", and if not the logic flow ends at step 875, otherwise the logic flow continues to step 810 where it is determined if SEQ_IND is set to a "1" or "0." If at step 810 SEQ_IND is set to "0" then remote unit 113 is to set RULM equal to the traffic channel preamble (step 815), otherwise RULM is set equal to SEQ (step 820).

The logic flow continues to step 825 where logic unit 401 accesses system time from clock 433 and determines a time to broadcast the RULM. If at step 825 the system time is greater than ACTION_TIME the logic flow continues to step 830, otherwise the logic flow returns to step 825. At step 830 logic unit 401 determines if the current time is greater than the frame in which the RULM starts (ACTION_TIME_FRM) plus its portion in which the RULM is sent at nominal power (MSG_SETUP_SIZE). In other words, logic unit determines if the current time>16*(ACTION_TIME_FRM)+MSG_SETUP_SIZE, and if not, the logic flow returns to step 830, otherwise the logic flow continues to step 835 where the RULM is broadcast over the traffic channel at an incremental transmit power level equal to INC_PWR for a number of power control groups equal to MSG_SIZE. In particular, logic unit 401 instructs amplifier 412 to amplify the RULM a predetermined amount during the MSG_SIZE interval and the RULM is continuously broadcast by remote unit 113 for at least MSG_SETUP_SIZE+MSG_SIZE power control groups. In the alternate embodiment of the present invention all serving and neighboring base stations within communication system 100 are provided with the Location Request Message in order to determine the exact contents of the RULM along with the time and frame that remote unit 113 transmits the RULM. This is done so that all active and neighbor base stations within communication system 100 will know when to tune receiving elements for reception of the RULM transmitted by remote unit 113. In the preferred embodiment of the present invention, remote unit 113 ignores power control bit commands from base stations 101 during transmission of the MSG_SIZE interval of the RULM, however, in an alternate embodiment, remote unit 113 adjusts its transmit power according the values of the power control bits during transmission of RULM. Additionally, in the alternate embodiment of the present invention, remote unit 113 transmits the RULM on a traffic channel using the remote unit's own public long code so that remote unit's 113 increased power transmission does not affect normal access channel messages from other remote units 113, but in alternate embodiments of the present invention, remote unit 113 may transmit the RULM via other channels (an access channel for example). Additionally, in an alternate embodiment of the present invention, remote unit 113 may transmit the RULM utilizing a specific frequency that is reserved for RULM transmission. In particular, to reduce system interference, remote unit 113 may be instructed to transmit the RULM on a frequency different than one utilized for normal traffic channel transmissions. Since remote unit 113 will transmit the RULM on a new frequency, communication system 100 may utilize the RULM reception on the new frequency as an aide in performing a hard handoff to the new frequency. In other words, communication system 100 can determine the quality of the RULM reception at the new frequency and determine if a hard handoff to that frequency is acceptable.

Continuing, at step 840 logic unit 401 instructs amplifier 412 to increase the transmit power level by PWR_STEP and counter 402 is indexed (step 845). In the preferred embodiment of the present invention logic unit 412 reads the nominal power level from memory 435 and adds it to the newly calculated INC_PWR. In an alternate embodiment logic unit 113 compares the nominal power during the previous RULM to the present stores in memory 435 the larger of the two and adds it to the newly calculated INC_PWR. The logic flow continues to step 850. In another alternate embodiment logic unit 401 instructs amplifier 412 to set the transmit power level to an absolute value determined from INC_PWR and ignore the nominal power during the MSG_SIZE interval.

At step 850 logic unit 401 determines three conditions; 1) if the maximum number of RULM transmissions has been exceeded, 2) if remote unit 113 has transmitted at full power for greater than a predetermined number of RULMs, and 3) if the base station has received enough data for location determination. In the alternate embodiment of the present invention, these conditions are determined by 1) determining if counter 402 has exceeded MAX_MSGS, 2) determining if remote unit 113 has transmitted at full power for greater than MAX_FULL_PWR RULMs, and 3) determining if an Ack has been received from an active base station indicating that remote unit 113 should cease RULM transmission. If at step 850, all of these conditions are false, the logic flow proceeds to step 855 where ACTION_TIME is incremented by MSG_PERIOD and then to step 825 to await the time for the next transmission, otherwise the logic flow continues to step 860 where counter 402 is reset by setting N to "0". The logic flow ends at step 875.

While the invention has been particularly shown and described with reference to particular embodiments, it will be understood by those skilled in the art that various changes in form and details may be made therein without departing from the spirit and scope of the invention, and it is intended that such changes come within the scope of the following claims.

What is claimed is:

1. A method for locating a remote unit in a communication system, the method comprising the steps of:

sending a first message to the remote unit, wherein the first message instructs the remote unit to send a second message to a serving base station;

receiving the second message transmitted from the remote unit in response to the first message;

determining from the second message, the serving and a neighbor base station;

transmitting a third message to the remote unit, wherein the third message instructs the remote unit to send a fourth message to the serving base station and the neighbor base station;

instructing the neighbor base station to tune a receiving element to obtain the fourth message;

receiving the fourth message; and determining from the fourth message, a location of the remote unit.

2. The method of claim 1 further comprising the step of instructing the neighbor base station to receive the fourth message at a predetermined time.

3. The method of claim 1 wherein the third message additionally instructs the remote unit to transmit the fourth message for a predetermined period of time and at a specified power level.

4. The method of claim 1 wherein the first message is broadcast to the remote unit over a paging channel.

5. The method of claim 1 wherein the first message is broadcast to the remote unit on a common control channel.

6. The method of claim 1 wherein the fourth message is broadcast from the remote unit on a traffic channel.

7. The method of claim 1 wherein the first message is a message from the group consisting of a Slotted Page Message, a Page Message, and a General Page Message.

8. The method of claim 1 wherein the third message further instructs the remote unit to periodically transmit the fourth message with increasing power levels a predetermined number of times.

9. A method for locating a remote unit in a communication system, the method comprising the steps of:

instructing a plurality of base stations within the communication system to transmit a first message, wherein the first message comprises an instruction for the remote unit to transmit a second message at a specified time and a time period to begin transmission of the second message;

instructing the plurality of base stations to tune receiving elements to obtain the second message;

receiving the second message at the plurality of base stations; and determining from the second message, a location of the remote unit.

10. The method of claim 9 wherein the step of instructing the plurality of base stations within the communication system to transmit the first message further comprises the step of instructing the plurality of base stations within the communication system to transmit the first message wherein the first message further comprises, a period of time that re-transmission of the second message is to occur, and a power level at which the remote unit is to transmit the second message.

11. The method of claim 9 wherein the first message additionally instructs the remote unit to transmit the second message for a predetermined period of time and a power level at which the remote unit is to transmit the second message.

12. The method of claim 9, wherein the first message is broadcast to the remote unit over a paging channel.

13. The method of claim 9 wherein the first message is broadcast to the remote unit over a common control channel.

14. The method of claim 9 wherein the second message is broadcast from the remote unit on a traffic channel.

15. The method of claim 9 wherein the first message further instructs the remote unit to periodically transmit the second message with increasing power levels for a predetermined number of times.

16. A communication system capable of transmitting to a remote unit, the communication system comprising:

a transmitter for transmitting a message, the message comprising, a field that indicates a second message that is to be transmitted by the remote unit, a field that indicates when the second message is to be transmitted, a field that indicates a number of power control groups that the second message is delayed prior to being transmitted, a field that represents an incremental power and a field that indicates an initial power at which the remote unit is to transmit the second message; and a location searcher for receiving the second message and determining the location of the remote unit.

17. The communication system of claim 16 wherein the message further comprises a field that indicates a time the remote unit must wait between consecutive transmissions of the second message, a field that indicates an amount to increase a power output of the second message, and a field that represents a maximum number of second messages to transmit at an increased power.

18. A method for locating a remote unit in a communication system, the method comprising the steps of:

receiving a first message comprising an instruction for the remote unit to transmit a second message at a specified time, a time period to begin transmission of the second message, a power level to begin transmission of the second message, a time period that the remote unit must wait between consecutive transmissions of the second message, and an amount to increase the power level for each transmission of the second message;

transmitting the second message to a plurality of base stations at a first power level and at a first time, wherein the first power level is equal to the power level to begin transmission of the second message and the second message is transmitted at a first time equal to the time period to begin transmission of the second message; and re-transmitting the second message to the plurality of base stations at a second power level equal to the first power level plus the amount to increase the power, wherein the second message is retransmitted at a second time equal to the first time plus the time period that the remote unit must wait between consecutive transmissions of the second message.

* * * * *